United States Patent
Glovier et al.

(10) Patent No.: US 11,015,993 B2
(45) Date of Patent: May 25, 2021

(54) SYSTEM AND METHOD FOR WIRELESSLY MONITORING THE OPERATIONAL STATUS OF TOOLS OF AN AGRICULTURAL IMPLEMENT

(71) Applicant: CNH Industrial America LLC, New Holland, PA (US)

(72) Inventors: Scott Glovier, Pittsburgh, PA (US); Raul Espinosa, Pittsburgh, PA (US); Michael R. Cozza, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/590,567

(22) Filed: Oct. 2, 2019

(65) Prior Publication Data
US 2021/0102856 A1   Apr. 8, 2021

(51) Int. Cl.
*G01L 5/00* (2006.01)
*G01N 27/20* (2006.01)
(Continued)

(52) U.S. Cl.
CPC .......... *G01L 5/0061* (2013.01); *A01B 61/042* (2013.01); *G01N 27/20* (2013.01);
(Continued)

(58) Field of Classification Search
CPC ........ G01L 5/0061; H04W 4/38; H04W 4/48; A01B 61/042; A01B 35/06; G01N 27/20
(Continued)

(56) References Cited

U.S. PATENT DOCUMENTS

| 2,113,666 A | 4/1938 | Suman |
| 2,124,965 A | 7/1938 | Lind |

(Continued)

FOREIGN PATENT DOCUMENTS

| CN | 102289644 A | 12/2011 |
| CN | 103630282 A | 3/2014 |

(Continued)

OTHER PUBLICATIONS

"Why Settle for Only One or Two Axes?" Design News 63.14, Cahners Publishing Co, Dated Oct. 6, 2008 (2 pages) http://dialog.proquest.com/professional/docview/743564886?accountid=157282.

(Continued)

*Primary Examiner* — Max H Noori
(74) *Attorney, Agent, or Firm* — Rebecca L. Henkel; Rickard K. DeMille

(57) ABSTRACT

A system for wirelessly monitoring the operational status of ground-engaging tools includes an attachment structure, a ground-engaging tool pivotably coupled to the attachment structure at a pivot point, and a shear pin at least partially extending through both the attachment structure and ground-engaging tool. In addition, the system includes a conductive member extending within the shear pin to form an electrical circuit therein, and a wireless circuit monitor coupled to the conductive member such that the circuit monitor is configured to detect a circuit parameter associated with the electrical circuit. Moreover, the system includes an antenna configured to receive data transmitted wirelessly from the circuit monitor that is indicative of the circuit parameter, and a controller configured to monitor the data received by the antenna and identify a change in a working condition of the shear pin based on a detected variation in the data.

20 Claims, 6 Drawing Sheets

(51) Int. Cl.
  *H04W 4/48* (2018.01)
  *A01B 61/04* (2006.01)
  *H04W 4/38* (2018.01)
  *A01B 35/06* (2006.01)

(52) U.S. Cl.
  CPC .............. *H04W 4/38* (2018.02); *H04W 4/48* (2018.02); *A01B 35/06* (2013.01)

(58) Field of Classification Search
  USPC .......................................................... 73/774
  See application file for complete search history.

(56) References Cited

U.S. PATENT DOCUMENTS

| | | | |
|---|---|---|---|
| 3,704,459 A | | 11/1972 | Young |
| 4,246,456 A | | 1/1981 | Leonard |
| 4,934,611 A | | 6/1990 | Lewis |
| 5,017,912 A | | 5/1991 | Willis |
| 5,142,914 A | | 9/1992 | Kusakabe et al. |
| 5,870,689 A | * | 2/1999 | Hale .................... A01B 79/005 702/5 |
| 5,923,270 A | * | 7/1999 | Sampo ................ A01B 69/008 180/6.7 |
| 6,041,582 A | * | 3/2000 | Tiede .................... A01B 79/005 56/10.2 A |
| 6,276,916 B1 | | 8/2001 | Schad et al. |
| 6,556,143 B2 | | 4/2003 | Noah |
| 7,009,123 B2 | | 3/2006 | Banville et al. |
| 7,324,882 B2 | | 1/2008 | Heinsey et al. |
| 7,353,723 B2 | | 4/2008 | Lardy et al. |
| 7,392,123 B2 | | 6/2008 | Heinsey et al. |
| 7,412,898 B1 | | 8/2008 | Smith et al. |
| 7,463,035 B2 | * | 12/2008 | Merchant ................ G01V 3/28 324/339 |
| 7,973,671 B2 | | 7/2011 | Cloutier et al. |
| 8,596,134 B2 | | 12/2013 | Mekid et al. |
| 8,810,370 B2 | | 8/2014 | Tillotson et al. |
| 9,144,199 B2 | | 9/2015 | Ritter et al. |
| 9,429,485 B1 | | 8/2016 | Cavallaro |
| 9,483,674 B1 | | 11/2016 | Fink et al. |
| 9,547,783 B2 | | 1/2017 | Lewis et al. |
| 9,645,061 B2 | | 5/2017 | Hsieh |
| 9,677,592 B2 | | 6/2017 | Bernhardt |
| 9,952,129 B2 | | 4/2018 | Kondo |
| 2001/0048369 A1 | | 12/2001 | Noah |
| 2006/0003846 A1 | | 1/2006 | Burger et al. |
| 2008/0046130 A1 | * | 2/2008 | Faivre ................ A01G 25/092 700/284 |
| 2017/0196160 A1 | * | 7/2017 | Bjerketvedt ......... A01B 61/042 |
| 2017/0321552 A1 | | 11/2017 | Gustafsson |
| 2018/0073542 A1 | | 3/2018 | Saigo et al. |
| 2018/0155132 A1 | | 6/2018 | Li et al. |

FOREIGN PATENT DOCUMENTS

| | | |
|---|---|---|
| CN | 204166662 U | 2/2015 |
| CN | 204256887 U | 4/2015 |
| CN | 104614775 A | 5/2015 |
| EP | 1557588 A1 | 7/2005 |
| JP | S 57191472 A | 11/1982 |
| JP | H 04204394 A | 7/1992 |
| JP | 2014109457 A | 6/2014 |
| JP | 6259203 B2 | 1/2018 |
| WO | WO 2009116966 | 9/2009 |
| WO | WO2018030942 | 2/2018 |

OTHER PUBLICATIONS

Bringing Internet of Things to Bolted Connections—StrainLabs, dated Oct. 17, 2018 (4 pages) https://strain-labs.com/bringing-internet-of-things-to-bolted-connections/.

Real Time Shank Bolt Detection, Shank Patrol, dated Oct. 22, 2018 (3 pages) https://shankpatrol.com/.

* cited by examiner

SYSTEM AND METHOD FOR WIRELESSLY MONITORING THE OPERATIONAL STATUS OF TOOLS OF AN AGRICULTURAL IMPLEMENT

FIELD

The present disclosure generally relates to agricultural implements and, more particularly, to systems and methods for wirelessly monitoring the operational status of ground-engaging tools of an agricultural implement, such as by wirelessly monitoring the operating status of shanks based on failure detection of the associated shear bolts or pins.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be pivotally coupled to a frame of the tillage implement. In many instances, biasing elements, such as springs, are used to exert biasing forces on the ground-engaging tools. This configuration may allow the ground-engaging tools to be biased towards a desired position relative to the frame, thereby maintaining the particular depth of soil penetration as the agricultural work vehicle pulls the tillage implement through the field. Additionally, this configuration may also permit the ground-engaging tools to pivot out of the way of rocks or other impediments in the soil, thereby preventing damage to the ground-engaging tools or other components on the implement.

In addition to such biasing elements, tillage implements often utilize a shear-bolt mounting arrangement in which shear pins or bolts are used to couple the ground-engaging tools to the frame or associated attachment structure. In such an embodiment, the shear pins serve to protect the ground-engaging tools from excessive loading that would otherwise substantially damage or break the tools. For instance, such a configuration may allow a ground-engaging tool to pivot out of the way of rocks or other impediments in the soil when the adjustability provided by the associated biasing element is insufficient.

When a shear pin breaks during the performance of an agricultural operation, the associated ground-engaging tool typically will no longer be capable of effectively working the soil. However, with current implement configurations, it is often very difficult for the operator to determine when one or more of the shear pins have failed. As such, an extensive portion of the field may have been worked before discovering the broken shear pin(s).

Accordingly, an improved system and method for wirelessly monitoring the operational status of ground-engaging tools, such as a change in the status of a ground-engaging tool due to failure of an associated shear pin, as the agricultural implement is moved across a field would be welcomed in the technology.

BRIEF DESCRIPTION

Aspects and advantages of the technology will be set forth in part in the following description, or may be obvious from the description, or may be teamed through practice of the technology.

In one aspect, the present subject matter is directed to a system for wirelessly monitoring the operational status of ground-engaging tools of agricultural implements. The system includes an attachment structure configured to be coupled to a frame of an agricultural implement, a ground-engaging tool pivotably coupled to the attachment structure at a pivot point, and a shear pin at least partially extending through both the attachment structure and ground-engaging tool to prevent pivoting of the ground-engaging tool about the pivot point when the shear pin is in an operable working condition. In addition, the system includes a conductive member extending at least partially within the shear pin to form an electrical circuit therein, and a wireless circuit monitor electrically coupled to the conductive member such that the wireless circuit monitor is configured to detect a circuit parameter associated with the electrical circuit. The wireless circuit monitor is also configured to wirelessly transmit data indicative of the detected circuit parameter. Moreover, the system includes an antenna configured to receive the data transmitted wirelessly from the wireless circuit monitor, and a controller communicatively coupled to the antenna, with the controller being configured to monitor the data received by the antenna and identify a change in the working condition of the shear pin based on a detected variation in the data.

In another aspect, the present subject matter is directed to an agricultural implement including a frame and a plurality of shank assemblies supported relative to the frame. Each shank assembly includes an attachment structure configured to be coupled to the frame, a shank pivotably coupled to the attachment structure at a pivot point, a shear pin at least partially extending through both the attachment structure and shank to prevent pivoting of the shank about the pivot point when the shear pin is in an operable working condition, and a conductive member extending at least partially within the shear pin to form an electrical circuit therein. The implement also includes a plurality of wireless circuit monitors, with each wireless circuit monitor being electrically coupled to the conductive member of a respective shank assembly of the plurality of shank assemblies such that the wireless circuit monitor is configured to detect a circuit parameter associated with the electrical circuit of the respective shank assembly. Each wireless circuit monitor is also configured to wirelessly transmit data indicative of the detected circuit parameter. Moreover, the implement includes an antenna configured to receive the data transmitted wirelessly from the plurality of wireless circuit monitors, and a controller communicatively coupled to the antenna, with the controller being configured to monitor the data received by the antenna and identify a change in the working condition of the shear pin of a given shank assembly of the plurality of shank assemblies based on a detected variation in the data.

In a further aspect, the present subject matter is directed to a method for wirelessly monitoring the operational status of a ground-engaging tool pivotally coupled to a frame of an agricultural implement, The method includes receiving data transmitted wirelessly from a wireless circuit monitor that is indicative of a circuit parameter associated with an electrical circuit formed within a shear pin extending through the ground-engaging tool, with the shear pin being configured to prevent pivoting of the ground-engaging tool about a respective pivot point when the shear pin is in an operable working condition. In addition, the method includes monitoring, with a computing device, the circuit parameter associated with the electrical circuit based on the data received from the wireless circuit monitor, and determining, with the computing device, that a change in the working condition of the shear pin has occurred based on a detected variation in the data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art; is set forth in the specification, which makes reference to the appended figures, in which.

Figure 1:
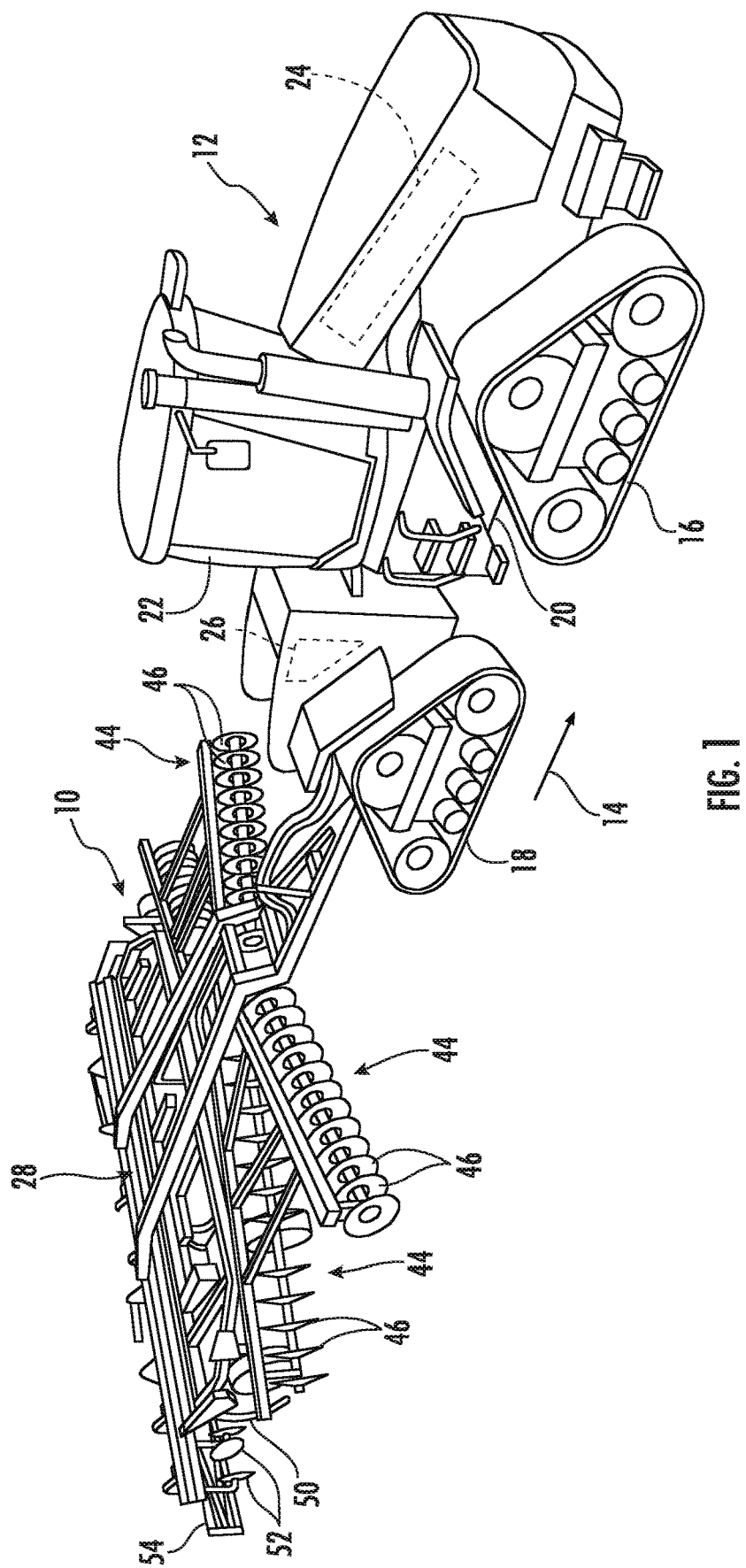
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the operational status of ground-engaging tools of an agricultural implement. Specifically, in several embodiments, the disclosed system may be utilized to monitor the operational status of ground-engaging tools, such as shanks, that are configured to be pivotably coupled to a frame of an agricultural implement and that include a shear bolt or pin extending therethrough to prevent pivoting of the tool relative to the frame during normal loading conditions. For example, in one embodiment, the disclosed system may include a wireless circuit monitor coupled to an electrical circuit formed within a shear pin extending through a shank of an agricultural implement. In such an embodiment, the wireless circuit monitor may be electrically coupled to the circuit to allow the circuit monitor to detect one or more circuit parameters associated with the electrical circuit that vary with changes in the working condition of the shear pin (e.g., with a transition from an operable working condition to a failed condition), such as the opened/closed state of the circuit or the resistance in the circuit.

In addition, the wireless circuit monitor may be configured to wirelessly transmit data associated with the detected circuit parameter to one or more associated antennas of the system. The antenna(s) may, in turn, be communicatively coupled to a controller of the system that is configured to monitor the data received from the wireless circuit monitor to identify variations in the data indicative of a change in the working condition of the shear pin. Thus, for example, the controller may monitor the data to detect when the shear pin has failed. The controller may then execute an appropriate control action in response to the detection of the shear pin failure, such as by notifying the operator of the failure or by performing an automated control action.

Figure 2:
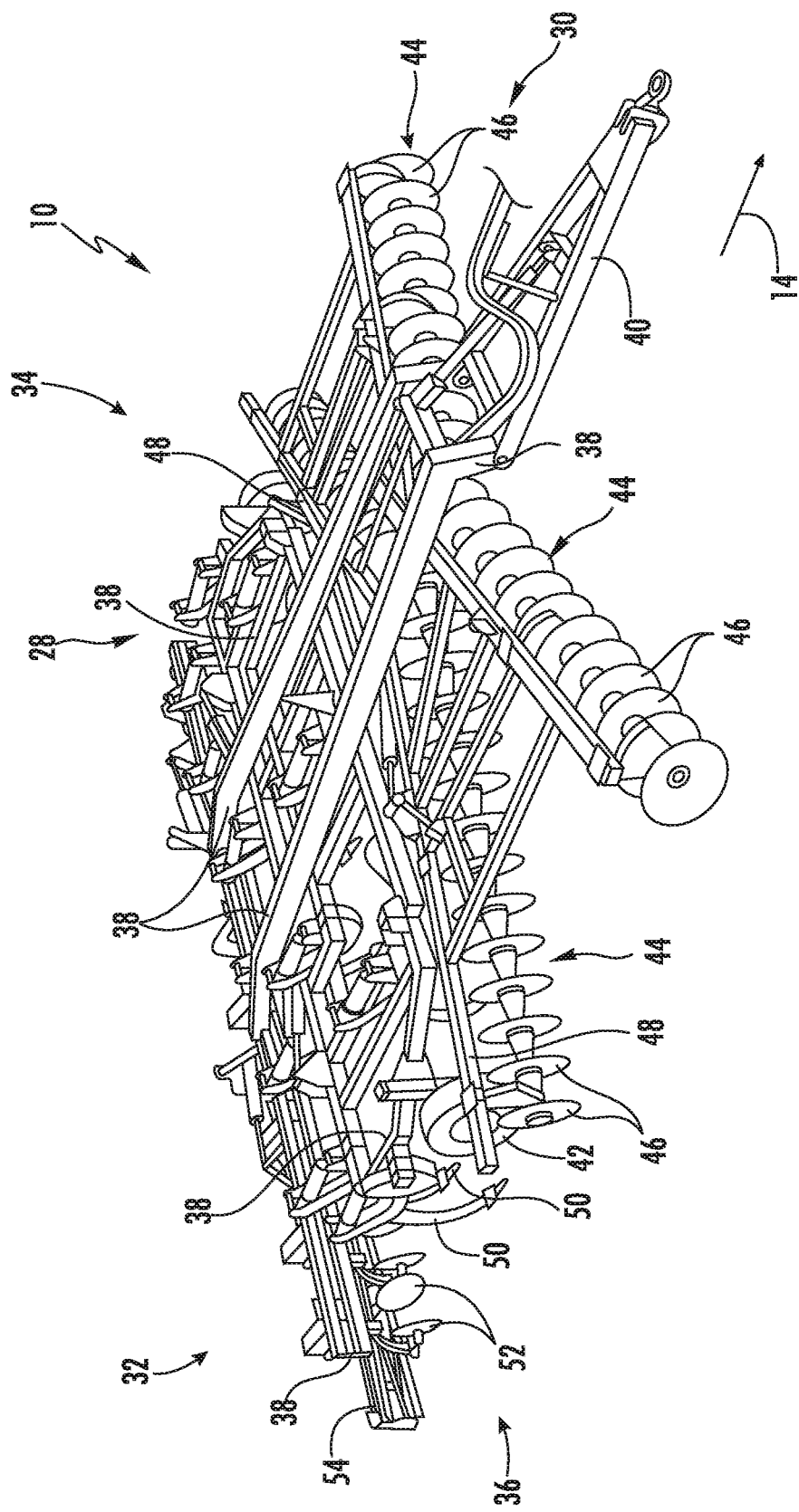
FIG. 2 illustrates another perspective view of the agricultural implement shown in FIG. 1 in accordance with aspects of the present subject matter, particularly illustrating various components of the implement.

Referring now to the drawings. FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown particularly in FIG. 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one of which is shown in FIG. 2) may be coupled to the frame 28 to facilitate towing the implement 10 in the direction of travel 14.

In several embodiments, one or more ground-engaging tools may be coupled to and/or supported by the frame 28. More particularly, in certain embodiments, the ground-engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground-engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil.

It should be appreciated that, in addition to the shanks 50 and the disc blades 46, the implement frame 28 may be configured to support any other suitable ground-engaging tools. For instance, in the illustrated embodiment, the frame 28 is also configured to support a plurality of leveling blades 52 and rolling (or crumbler) basket assemblies 54. In other embodiments, any other suitable ground-engaging tools may be coupled to and supported by the implement frame 28.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
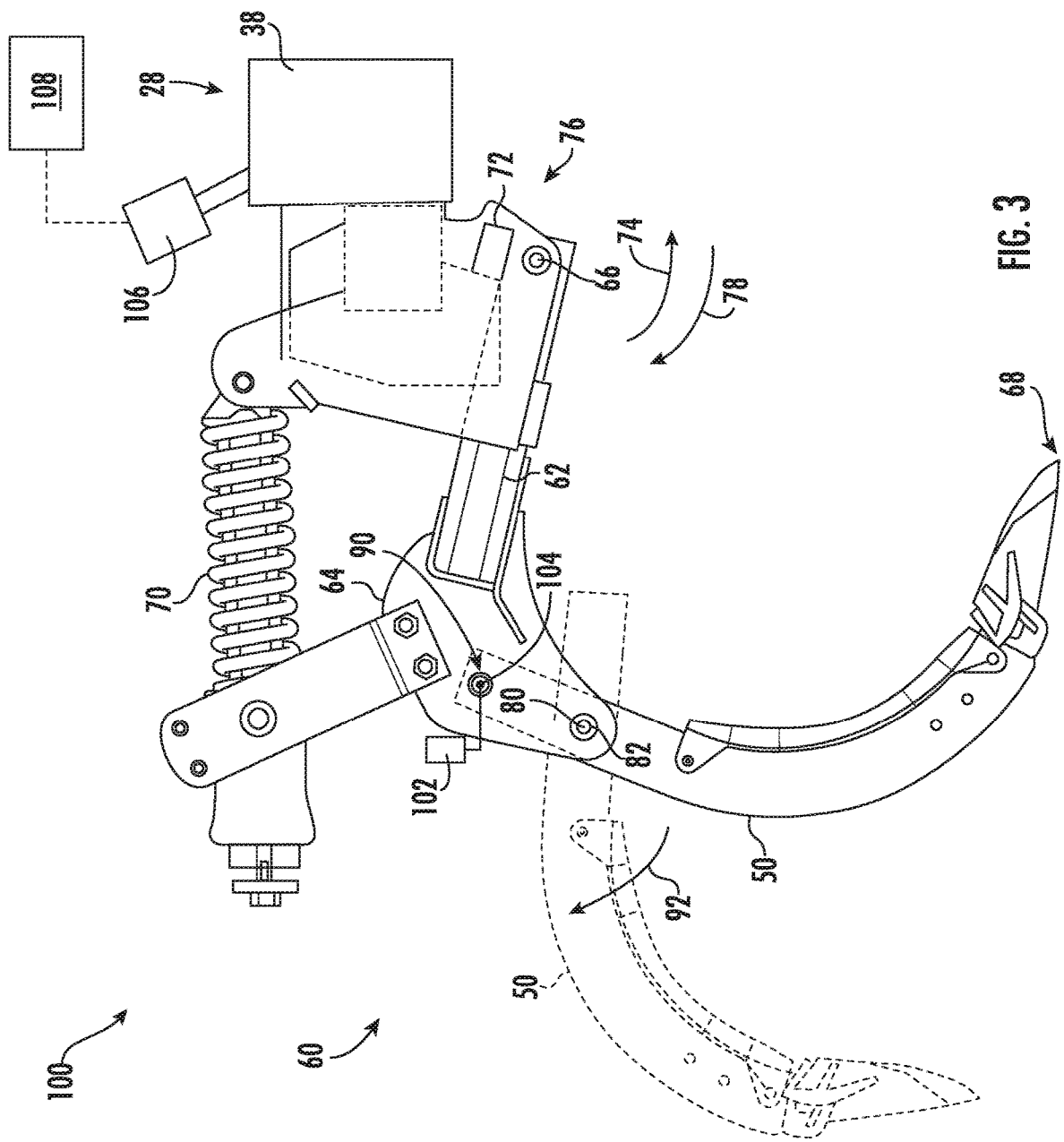
FIG. 3 illustrates a side view of one embodiment of a shank assembly including a shank pivotally coupled to an implement frame in accordance with aspects of the present subject matter, particularly illustrating a shear pin extending through the shank and associated components of one embodiment of a system for monitoring the operational status of the shank in accordance with aspects of the present subject matter.

Referring now to FIG. 3, a side-view of a shank assembly 60 including one of the shanks 50 of the tillage implement 10 described above with reference to FIGS. 1 and 2 is illustrated in accordance with aspects of the present subject matter. As shown in the illustrated embodiment, the shank assembly 60 includes both the shank 50 and associated attachment structure (e.g., first and second attachment members 60, 62) for pivotally coupling the shank 50 to the implement frame 28 (e.g., at a first pivot point 66). As shown in FIG. 3, the shank 50 may include a tip end 68 that is configured to penetrate into or otherwise engage the ground as the implement 10 is being pulled through the field. In one embodiment, the shank 50 may be configured as a chisel. However, one of ordinary skill in the art would appreciate that the ground-engaging tool may be configured as a sweep, tine, or any other suitable ground-engaging tool. It should also be appreciated an auxiliary attachment may also be coupled to the shank 50 at its tip end 68, such as a point attachment.

As shown in FIG. 3, in several embodiments, a biasing element 70 may be coupled between the frame 28 and the shank assembly 60 to bias the shank 50 to a predetermined ground-engaging tool position (e.g., a home or base position) relative to the frame 28. In general, the predetermined ground-engaging tool position may correspond to a ground-engaging tool position in which the shank 50 penetrates the soil to a desired depth. In several embodiments, the predetermined ground-engaging tool position may be set by a mechanical stop 72. In operation, the biasing element 70 may permit relative movement between the shank 50 and the frame 28. For example, the biasing element 70 may be configured to bias the shank 50 to pivot relative to the frame 28 in a first pivot direction (e.g., as indicated by arrow 74 in FIG. 3) until an end 76 of the first attachment member 62 of the shank assembly 60 contacts the stop 72. The biasing element 70 may also allow the shank 50 to pivot away from the predetermined ground-engaging tool position (e.g., to a shallower depth of penetration), such as in a second pivot direction (e.g., as indicated by arrow 78 in FIG. 3) opposite the first pivot direction 74, when encountering rocks or other impediments in the field. As shown in FIG. 3, the biasing element 70 may be configured as a spring. It should be recognized, however, the biasing element 70 may be configured as an actuator or any other suitable biasing element.

As further illustrated in FIG. 3, the shank 50 may further be pivotably coupled to the attachment structure 62, 64 of the shank assembly 60 at a second pivot point 80 to allow pivoting of the shank 50 relative to the attachment structure about such pivot point 80 independent of the pivotal motion about the first pivot point 66. More particularly, as shown in the illustrated embodiment, the shank 50 is pivotally coupled to the second attachment member 64 of the attachment structure at the second pivot point 80, which, in turn, is coupled to the frame 28 at the first pivot point 66 via the first attachment member 64. In such an embodiment, the shank 50 may be coupled to the second attachment member 64 via an associated pivot member 82 (e.g., a pivot bolt or pin) extending through both the shank 50 and the attachment member 64 at the second pivot point 80.

Additionally, as shown in FIG. 3, the shank assembly 60 may further include a shear bolt or pin 90 (simply referred to hereinafter as a "shear pin" for simplicity purposes and without intent to limit) at least partially extending through both the attachment member 64 and the shank 50 at a location separate from the pivot point 80 defined between such components. For instance, in the illustrated embodiment, the shear pin 90 is positioned above the pivot point 80 defined between the shank 50 and the adjacent attachment member 64. In general, the shear pin 90 may be configured to prevent rotation of the shank 50 relative to the attachment member 64 when the shear pin 90 is in an operable working condition, for instance when the shear pin 90 has not sheared or otherwise failed. In one embodiment, the shear pin 90 may correspond to a mechanical pin designed such that the pin breaks when a predetermined force is applied through the pin. For instance, the shear pin 90 may be designed to withstand normal or expected loading conditions for the shank 50 and fail when the loads applied through the pin 90 exceed or substantially exceed such normal/expected loading conditions.

During normal operation, the tip end 68 of the shank 50 may encounter impediments in the field causing the shank assembly 60 to rotate about the first pivot point 66 in the second pivot direction 78. Typically, the shank 50 will pivot upwards in the second pivot direction 78 about the first pivot point 66 to clear the impediment and then will return to its home or ground-engaging position via the action of the biasing element 70. However, in certain instances, the shank assembly 60 may fully rotate until the attachment structure contacts the mechanical stop 72 without clearing the impediment, in which case a significant amount of force may be transmitted through the shank assembly 60. In such instances the shear pin 90 may be designed to fracture or fail, thereby allowing the shank 50 to rotate about the second pivot point 80 relative to the attachment member 64. For instance, the shank 50 may rotate about the second pivot point 80 (as indicated by arrow 92 in FIG. 3) to the shank position indicated by dashed lines in FIG. 3.

Moreover, in accordance with aspects of the present subject matter, FIG. 3 also illustrates components of one embodiment of a system 100 for wirelessly monitoring the operational status of ground-engaging tools of agricultural implements. Specifically, in the illustrated embodiment, the system 100 is shown as being configured for use in wirelessly monitoring the operational status of a shank assembly 60 based on failure detection of the shear pin. However, in other embodiments, the system 100 may be utilized to monitor the operational status of any other suitable ground-engaging tools of an agricultural implement, such as any tools having a shear pin provided in operative association therewith.

As shown in FIG. 3, the system 100 includes a wireless circuit monitor 102 configured to detect a parameter associated with an electrical circuit (indicated by dot 104 in FIG. 3) formed or provided within the shear pin 90. For instance, as will be described below with reference to FIGS. 4-6, a conductive member may be installed within the shear pin 90 to form a looped electrical circuit extending through the interior of the shear pin 90. In such an embodiment, the wireless circuit monitor 102 may be electrically coupled to the circuit 104 to allow the circuit monitor 102 to detect one or more parameters associated with the electrical circuit 104 that vary with changes in the working condition of the shear pin 90 (e.g., with a transition from an operable working condition to a failed condition), such as the opened/closed state of the circuit 104 or the resistance in the circuit 104. In addition, the wireless circuit monitor 102 may be configured to wirelessly transmit data associated with the detected circuit parameter to one or more associated antennas 106 of the system 100. The antenna(s) 106 may, in turn, be communicatively coupled to a controller 108 of the system 100 that is configured to monitor the data received from the wireless circuit monitor 102 to identify variations in the data (e.g., due to variations in the detected circuit parameter) indicative of a change in the working condition of the shear pin 90. Thus, for example, the controller 108 may monitor the data to detect when the shear pin 90 has failed. The controller may then execute an appropriate control action in response to the detection of the shear pin failure, such as by notifying the operator of the failure or by performing an automated control action.

It should be appreciated that, for purposes of illustration, the system 100 is generally shown in FIG. 3 as including a single wireless circuit monitor 102 configured to detect a parameter associated with the electrical circuit 104 formed in the shear pin 90 of the respective shank assembly 60. However, in other embodiments, the system 100 may include a plurality of wireless circuit monitors 102, with each circuit monitor 102 being configured to detect a parameter associated with the electrical circuit 104 formed in the shear pin 90 of a respective shank assembly 60. For instance, the associated agricultural implement 10 may include a plurality shank assemblies 60, with each shank assembly 60 including a shear pin 90 having an electrical circuit 104 formed or provided therein. In such an embodiment, each shank assembly 60 may include or be provided in operative association with a respective wireless circuit monitor 102 to detect a circuit parameter(s) of the electrical circuit 104 that varies with changes in the working condition of the associated shear pin 90. The data generated by each circuit monitor 102 may then be wirelessly transmitted to a single antenna 106 or multiple antennas 106, if necessary, to allow the controller 108 to monitor the working condition of each shear pin 90 of the agricultural implement 10.

In general, each wireless circuit monitor 102 may include any device or component (or combination of devices and components) that allows the circuit monitor 102 to detect one or more circuit parameters associated with the electrical circuit 104 of the respective shank pin 90 and wirelessly transmit data indicative of such detect parameter(s) to the associated system antenna(s) 106. Specifically, in several embodiments, each wireless circuit monitor 102 may include one or more sensors configured to detect the relevant circuit parameter(s) (e.g., a voltage sensor, a current sensor, a resistance sensor, and/or the like) and an associated wireless communication device configured to wirelessly transmit the data generated by the sensor(s) to the associated antennas) 106. For instance, in one embodiment, the wireless communications device of each wireless circuit monitor 102 may correspond to an RFID tag (e.g., a passive RFID tag or an active RFID tag). In such an embodiment, the associated antenna(s) 106 may form part of or may be communicatively coupled to a suitable RFID interrogator or reader. For instance, in an embodiment in which each wireless circuit monitor 102 includes a passive RFID tag, the antenna(s) 106 may form part of or may be communicatively coupled to an active RFID reader configured to actively transmit interrogation signals to each associated RFID tag and receive the corresponding reply signals from the tag. Such interrogation signals may be used to power both the RFID tag and the associated sensor(s) of the wireless circuit monitor 102, thereby allowing the circuit monitor 102 to detect the relative circuit parameter(s) and transmit reply signals or data in response to the interrogation signals. Alternatively, in an embodiment in which each wireless circuit monitor includes an active RFID tag, the antenna(s) 106 may form part of or may be communicatively coupled to a passive RFID reader configured to receive the radio signals transmitted from the tag. In such an embodiment, the power source for the MD tag may also serve as the power source for the associated sensor(s) of the wireless circuit monitor 102.

It should be appreciated that, as an alternative to an RFID tag, each wireless circuit monitor 102 may include any other suitable wireless communications device configured to wirelessly transmit the data for receipt by an associated antenna(s) 106 using any suitable wireless communication protocol(s) or other suitable wireless signal transmission technology. For instance, in some embodiments, each wireless circuit monitor 102 may include a wireless communications device configured to transmit short-range wireless signals, such as by using Bluetooth, Near-Field Communications, Wi-Fi., Zigbee, RuBee, and/or any wide-range wireless signals using any suitable wireless communication protocol.

It should be also appreciated that each wireless circuit monitor 102 may generally be installed at any suitable location that allows the circuit monitor 102 to be electrically coupled to the electrical circuit 104 formed within its respective shear pin 90. For instance, as shown in the illustrated embodiment, the wireless circuit monitor 102 is mounted on the shank assembly 60 at a location adjacent to, but separate from the shear pin 90, such as by securing the wireless circuit monitor to the second attachment member 64. However, in other embodiments, each wireless circuit monitor 102 may be disposed at any other suitable location relative to the shear pin 90 and/or relative to the shank assembly 60. For instance, as will be described below with reference to FIG. 6, the wireless circuit monitor 102 may, instead, be coupled directly to the shear pin 90.

Moreover, the system antenna(s) 106 may be configured to be installed at any suitable location relative to the wireless circuit monitor(s) 102 that allows the antenna(s) 106 to receive the data wirelessly transmitted from the circuit monitor(s) 102. For instance, when the wireless transmission device of each wireless circuit monitor 102 has a given wireless transmission range, the antenna(s) 106 may be installed at any suitable location on the implement 10 that falls within such wireless transmission range. As shown in the illustrated embodiment, the antenna(s) 106 is mounted to a portion of the implement frame 28. However, in other embodiments, the antenna(s) 106 may be mounted to any other suitable component of the implement 10 within the wireless transmission range of each associated wireless circuit monitor 102.

Additionally, in the illustrated embodiment, the system 100 is shown as simply including a single antenna 106. However, in other embodiments, the system 100 may include any other suitable number of antennas 106, such as two or more antennas. In general, the exact number of antennas 106 used within the system 100, as well as the positioning and/or orientation of the antennas 106, will generally vary depending on the number, configuration, and/or positioning of the associated wireless circuit monitors 102. For instance, in embodiments in which a wireless circuit monitor 102 is provided in operative association with each shank assembly 60 of an agricultural implement 10, it may be desirable for the system 100 to include two or more antennas 106 to ensure that the wireless data transmitted from each wireless circuit monitor 102 is capable of being received by at least one of the antennas 106.

Figure 4:
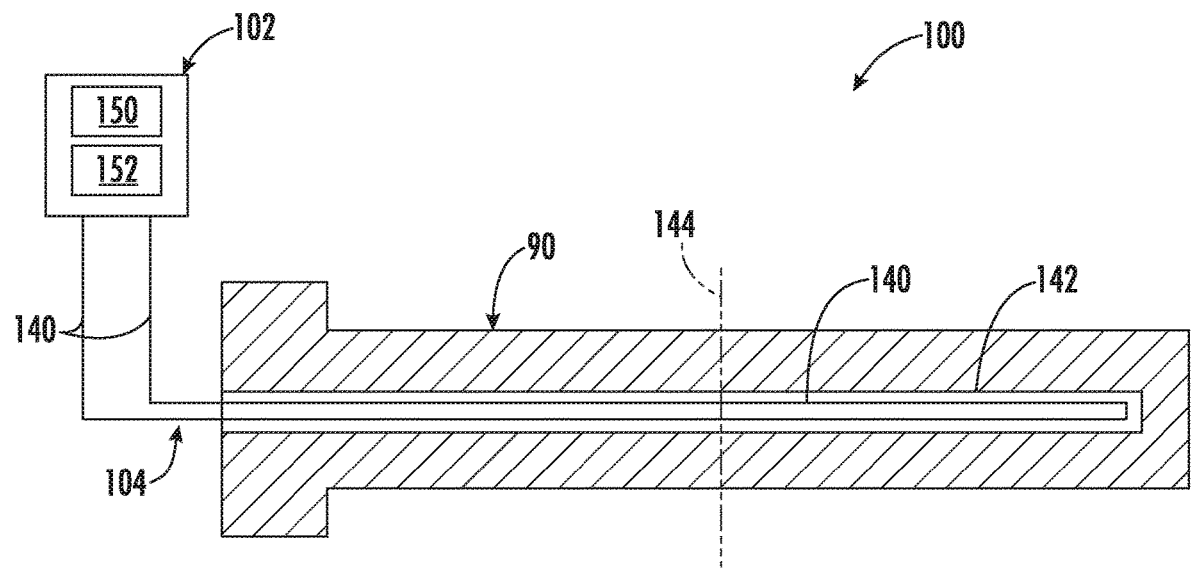
FIG. 4 illustrates a simplified, cross-sectional view of one embodiment of a shear pin arrangement having an electrical circuit formed therein and an associated wireless circuit monitor coupled to the electrical circuit in accordance with aspects of the present subject matter.
Figure 5:
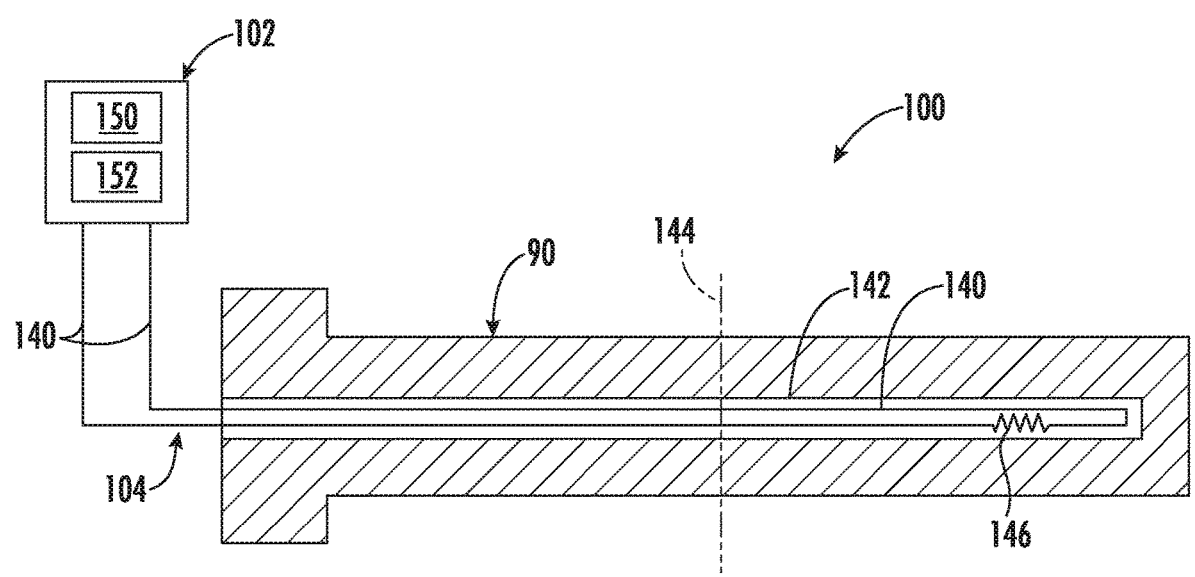
FIG. 5 illustrates a simplified, cross-sectional view of another embodiment of a shear pin arrangement having an electrical circuit formed therein and an associated wireless circuit monitor coupled to the electrical circuit in accordance with aspects of the present subject matter.
Figure 6:
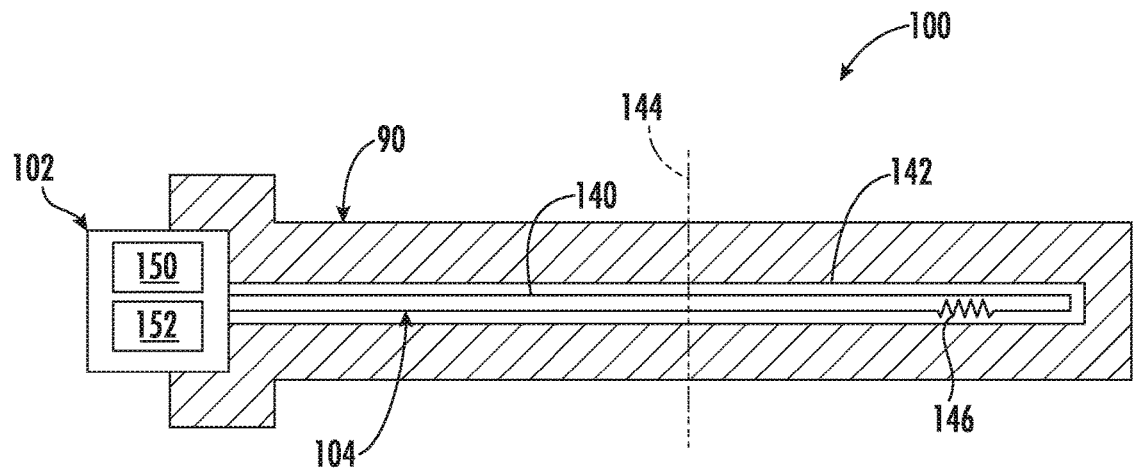
FIG. 6 illustrates a simplified, cross-sectional view of a further embodiment of a shear pin arrangement having an electrical circuit formed therein and an associated wireless circuit monitor coupled to the electrical circuit in accordance with aspects of the present subject matter.

Referring now to FIGS. 4-6, various different shear pin configurations and associated wireless circuit monitors 102 that may be utilized within embodiments of the disclosed system 100 are illustrated in accordance with aspects of the present subject matter. As indicated above and as shown in FIGS. 4-6, each shear pin 90 may include a conductive member 140 (e.g., a wire) extending at least partially within the shear pin 90 to form an electrical circuit 104 therein. For instance, as shown in the illustrated embodiments, each shear pin 90 includes a bore or wire cavity 142 defined therein to allow a conductive member 140 to be inserted within the shear pin 90 along a looped path, thereby allowing the conductive member 140 to form a closed loop electrical circuit 104 therein. In such an embodiment, it should be appreciated that the conductive member 140 may be insulated from the material forming the shear pin 90 (e.g., a metal material), such as by coating the conductive member 140 with an insulating or non-conductive coating.

In the illustrated embodiment, the conductive member 140 extends within the shear pin 90 across substantially the entire length of the pin 90. However, in other embodiments, the conductive member 140 may be configured to extend any other suitable length within the shear pin 90 that allows the disclosed system 100 to function as described herein. For instance, in general, the conductive member 140 should extend within the shear pin 90 a given length such that the electrical circuit 104 is defined along either side of an anticipated failure location for the shear pin 90 (e.g., as indicated by line 144 in FIGS. 4-6), thereby allowing the electrical circuit 104 to be broken or opened upon shearing or failure of the shear pin 90.

Moreover, as shown in FIGS. 4-6, each wireless circuit monitor 102 may, in several embodiments, include both a sensor 150 configured to detect a circuit parameter associated with circuit 104 to which it is electrically coupled and a wireless communications device 152 configured to wirelessly transmit data indicative of the detected parameter to an associated antenna(s) 106 (FIG. 3) of the disclosed system 100. As indicated above, the wireless communications device 152 may, in one embodiment, correspond to an RFID tag, such as a passive RFID tag or an active RFID tag. In the case of a passive RFID tag, the interrogation signals from the associated RFID reader may be used to power both the tag and the sensor 150, as well as to provide a voltage across the electrical circuit 104. In the case of an active RFID tag, each wireless circuit monitor 102 may also include a power source (not shown), such as a battery, for powering the tag and the sensor 150 and for providing a voltage across the electrical circuit 104.

In the embodiment shown in FIG. 4, the sensor 150 of the wireless circuit monitor 102 is configured to detect the opened/closed state of the electrical circuit 104, which, in turn, is indicative of the working condition of the associated shear pin 90. Specifically, when the shear pin 90 is intact or is otherwise in an operable working condition, the electrical circuit 104 formed within the shear pin 90 will be in a closed state (i.e., the conductive member 140 will form a closed circuit). However, upon failure of the shear pin 90 (e.g., upon shearing of the pin 90 along line 144), the electrical circuit 104 will transition from the closed state to an opened state. In such instance, by monitoring the opened/closed state of the electrical circuit 104 via the sensor 150, the wireless circuit monitor 102 may be configured to transmit or broadcast data to the associated antenna(s) 106 that allows the working condition or status of the shear pin 90 to be evaluated by the system controller 108.

It should be appreciated that, when monitoring the opened/closed state of the electrical circuit 104, the sensor 150 may generally correspond to any suitable sensing device(s) that allows for such circuit state to be detected. For instance, in one embodiment, the sensor 150 may correspond to a voltage sensor or voltmeter configured to detect the voltage across the circuit 104, In such an embodiment, the voltage across the electrical circuit 104 in the closed state will be equal to zero. However, as the circuit 104 is opened due to failure of the shear pin 90, the voltage across the circuit will increase to the source voltage. Such detection of the voltage change, thus, provides an indication of the shear pin failure.

In the embodiments shown in FIGS. 5 and 6, a resistor 146 has been added to the portion of the electrical circuit 104 extending within the shear pin 90. In such embodiments, the sensor 150 of the wireless circuit monitor 102 may, for example, correspond to a resistance sensor or ammeter configured to detect the resistance in the electrical circuit 104, which, in turn, is indicative of the working condition of the associated shear pin 90. Specifically, when the shear pin 90 is intact or is otherwise in an operable working condition, the electrical circuit 104 formed within the shear pin 90 will be in a closed state (i.e., the conductive member 140 and associated resistor 146 will form a closed circuit) and the resistance in the circuit 104 will generally be equal to a value associated with the resistance of the resistor 146, However, upon failure of the shear pin 90 (e.g., upon shearing of the pin 90 along line 144), the electrical circuit 104 will transition from the closed state to an opened state. In such instance, the resistance detected by the sensor 150 will increase to infinity. Thus, by detecting changes in the resistance via the sensor 150, the wireless circuit monitor 102 may be configured to transmit or broadcast data to the associated antenna(s) 106 that allows the working condition or status of the shear pin 90 to be evaluated by the system controller 108.

It should be appreciated that, in addition to evaluating the working condition or status of the shear pin 90 based on the data received from the associated antenna(s) 106, the system controller 108 may also identify changes in the working condition or status of a shear pin 90 based on a lack of data received from the associated antenna(s) 106. For example, in the embodiment shown in FIG. 6, upon failure of the shear pin 90 (e.g., upon shearing of the pin 90 along line 144), the portion of the pin 90 to which the wireless circuit monitor 102 is coupled may fall from the associated shank assembly 60 onto the ground, which will result in the wireless circuit monitor 102 being incapable of communicating data to the association antenna(s) 106 as the implement 10 continues to be moved across the field. In such instance, depending on the sampling rate and/or the transmission rate of the wireless circuit monitor 102, it is possible that data indicative of the shear pin failure will not have been transmitted to the antenna(s) 106 prior to the wireless circuit monitor 102 being positioned outside the associated wireless transmission range. Nonetheless, the system controller 108 can still estimate or infer that the shear pin 90 has failed based on the lack of data received from the wireless circuit monitor 102 by the associated antenna(s) 106. Specifically, when the controller 108 determines that data is no longer being received from a given wireless circuit monitor 102, it be can inferred that the corresponding shear pin 90 has failed.

It should be appreciated that FIGS. 4-6 also illustrate differing installation locations for the wireless circuit monitor 102 relative to its respective shear pin 90. For instance, the embodiments shown in FIGS. 4 and 5, the wireless circuit monitor 102 is installed at a location separate from the shear pin 90, such as at the installed location on the second attachment member 64 shown in FIG. 3. Alternatively, in the embodiment shown in FIG. 6, the wireless circuit monitor 102 is mounted directly to the shear pin 90, such as by being coupled to a head or exposed portion of the shear pin 90.

Figure 7:
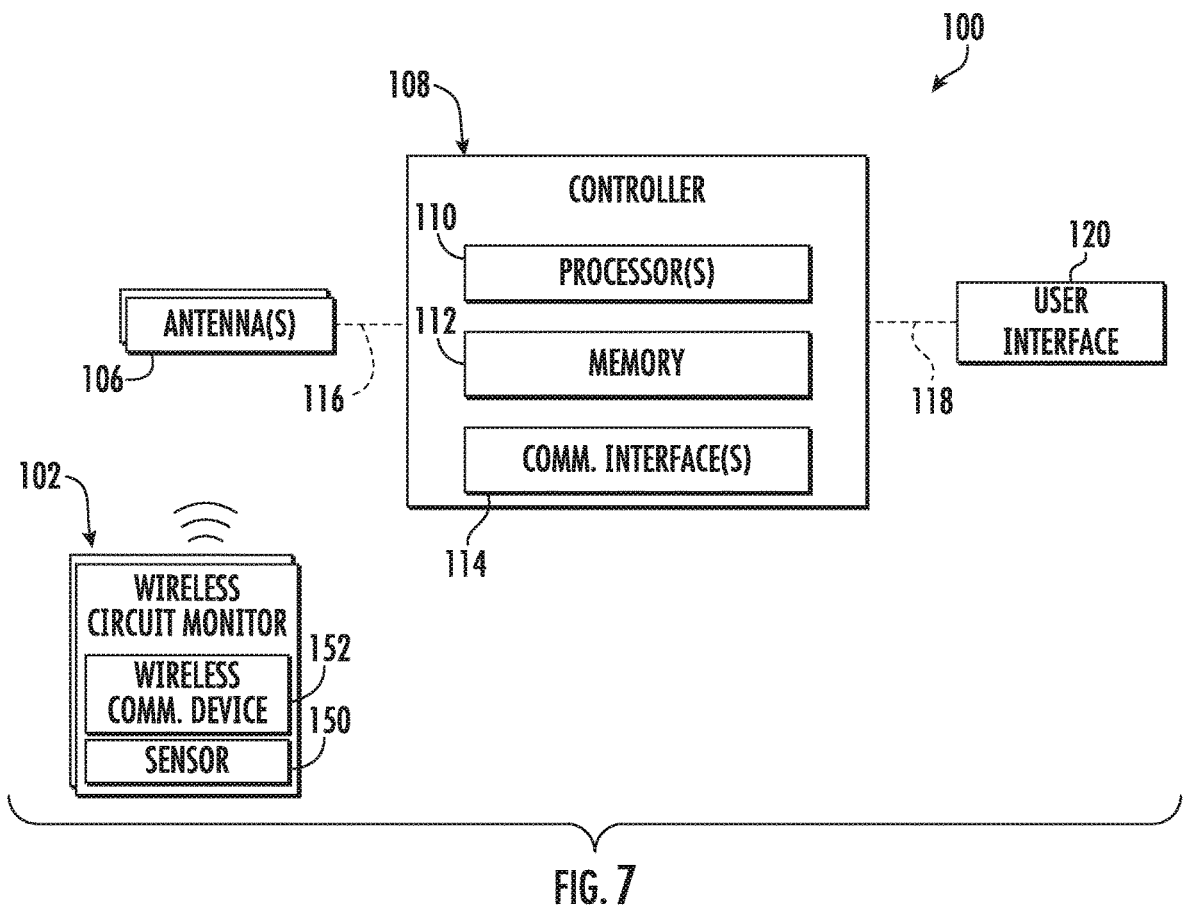
FIG. 7 illustrates a schematic view of one embodiment of a system for monitoring the operational status of a ground-engaging tool of an agricultural implement in accordance with aspects of the present subject matter.

Referring now to FIG. 7, a schematic view of one embodiment of a system 100 for monitoring the operational status of a ground-engaging tool of an agricultural implement is illustrated in accordance with aspects of the present subject matter. In general, the system 100 will be described herein with reference to the embodiment of the implement 10 described above with reference to FIGS. 1 and 2 and, in particular, the embodiment of the shank assembly 60 and related system components described above with reference to FIGS. 3-6. However, it should be appreciated that, in general, the disclosed system 100 may be utilized with any suitable implement having any suitable implement configuration to allow the operational status of a ground-engaging tool to be monitored. Moreover, it should be appreciated that aspects of the disclosed system 100 may also be utilized with any other suitable ground-engaging tools of a given agricultural implement.

As indicated above, in several embodiments, the system 100 may include a wireless circuit monitor 102 electrically coupled to an electrical circuit 104 (FIGS. 3-6) formed within the shear pin 90 of a respective shank assembly 60 and one or more signal receivers or antennas 106 configured to receive the data transmitted from the wireless communications device 152 (e.g., an RFID tag) of each wireless circuit monitor 102. Additionally, as indicated above, the system 100 may also include a controller 108 communicatively coupled to the antenna(s) 106. In general, the controller 108 may be configured to analyze the data received by the antenna(s) 106 from each wireless circuit monitor 102 (or the lack thereof) to determine or infer the working status of each respective shear pin 90. Specifically, in several embodiments, the controller 108 may be configured to monitor the circuit parameter(s) detected by the sensor 150 of each wireless circuit monitor 102 to identify variations in the monitored circuit parameter(s) that are indicative of a change in the working condition of the associated shear pin 90, thereby allowing the controller 108 to determine or infer when a given shear pin 90 has failed. Similarly, the controller 108 may be configured to infer that a given shear pin 90 has failed when data is no longer being received from the associated wireless circuit monitor 102. Additionally, the controller 108 may be configured to execute one or more control actions in response to determining that one or more of the shear pins 90 have failed. For instance, in one embodiment, the controller 108 may notify the operator of the shear pin failure(s). In addition to notifying the operator (or as an alternative thereto), the controller 108 may be configured to execute one or more automated control actions, such as by automatically stopping the implement 10 and/or by raising the shank assemblies 60 out of the ground.

In general, the controller 108 may correspond to any suitable processor-based device(s), such as a computing device or any combination of computing devices. Thus, as shown in FIG. 7, the controller 108 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data that can be retrieved, manipulated, created and/or stored by the processor(s) 110 and instructions that can be executed by the processor(s) 110. The instructions stored within the memory 112 may, when implemented by the processor(s) 110, configure the controller 108 to perform various computer-implemented functions, such as one or more aspects of the method 200 described below with reference to FIG. 8.

Moreover, as shown in FIG. 7, the controller 108 may also include a communications interface 114 to provide a means for the controller 108 to communicate with any of the various other system components described herein. For instance, one or more communicative links or interfaces 116 (e.g., one or more data buses) may be provided between the communications interface 114 and the antennas) 106 to allow the data received by the antenna(s) 106 to be transmitted to the controller 108. Similarly, one or more communicative links or interfaces 118 (e.g., one or more data buses) may be provided between the communications interface 114 and one or more components of the system 100, such as a user interface 120, to allow the controller 108 to control the operation of and/or otherwise communicate with such system components.

It should be appreciated that the controller 108 may correspond to an existing controller of the implement 10 or the work vehicle 12 or the controller 108 may correspond to a separate processing device. For instance, in one embodiment, the controller 108 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

As indicated above, the controller 108 may be configured to monitor the circuit parameter(s) detected by the sensor 150 of each wireless circuit monitor 203 based on the data wirelessly received from the circuit monitors 102 (e.g., via the antenna(s) 106), For instance, in one embodiment, the controller 108 may be configured to monitor the opened/closed state of the electrical circuit 104 formed within each shear pin 90 based on the data received from the associated circuit monitor 102. In such an embodiment, when the controller 108 identifies that a given electrical circuit 104 has transitioned from a closed state to an opened state, the controller 108 may determine or infer that its associated shear pin 90 has failed. In another embodiment, the controller 108 may be configured to monitor the resistance in the electrical circuit 104 formed within each shear pin 90 based on the data received from the associated circuit monitor 102. In such an embodiment, when the controller 108 identities a significant variation in the resistance in a given electrical circuit 104, the controller 108 may determine or infer that its associated shear pin 90 has failed, in yet another embodiment, the controller 108 may simply identify when data is no longer being received from a given circuit monitor 102, in which case that controller 108 may determine or inter that its associated shear pin 90 has failed.

As shown in FIG. 7, the system 100 may also include a user interface 120 communicatively coupled to the controller 108. In one embodiment, the user interface 120 may be configured to provide feedback (e.g., notifications associated with status of the tools being monitored (e.g., one or more of the shanks 50) to the operator of the implement 10. For instance, the controller 108 may be configured to alert the operator of a change in the working condition of one or more of the shear pins 90, such as when it is determined that a given shear pin 90 has failed due to a detected change in the monitored circuit parameter(s), thereby allowing the operator to make determination as to whether it is necessary to stop the operation of the implement 10 to check the status of the associated shear pin(s) 90. Such notifications to the operator may be particularly advantageous in situations in which the shear pin 90 has failed, but the shank 50 has not rotated backwards relative to the adjacent attachment structure to a noticeable degree (e.g., due to friction between the shank 50 and the attachment structure). In such instances, an operator visually examining the shank assemblies 60 may not recognize that one or more of the shear pins 90 are no longer in an operable working condition. Accordingly, alerting the operator of changes to the working condition of the shear pins 90 allows for accurate and timely detection of shear pin failures.

It should be appreciated that the user interface 120 may include or be associated with one or more feedback devices (not shown), such as display screens, speakers, warning lights, and/or the like, which are configured to communicate such feedback. In one embodiment, the controller 108 may be configured to generate an interface element for display to an operator on the user interface 120. In such an embodiment, the interface element may, for example, be associated with a visual indicator indicative of the working condition of tools being monitored (e.g., by indicating a change in the working condition of the shear pin 90 associated with one of the shank assemblies 60). It should be appreciated that, in one embodiment, the controller 108 may be configured to generate a separate interface element for each shear pin 90 associated with the various shank assemblies 60 of the implement 10 or may generate a single interface element representing the working condition of multiple shear pins 90. In addition, some embodiments of the user interface 120 may include one or more input devices (not shown), such as touchscreens, keypads, touchpads, knobs, buttons, sliders, switches, mice, microphones, and/or the like, which are configured to receive user inputs from the operator. In one embodiment, the user interface 120 may be positioned within the operator's cab 22 of the work vehicle 12. However, in alternative embodiments, the user interface 120 may have any suitable configuration and/or be positioned in any other suitable location.

In addition to such operator notifications (or as an alternative thereto), the controller 109 may be configured to implement a control action in response to determining that a change in the working condition of one or more shear pins 90 has occurred. For example, the controller 108 may communicate a signal to stop movement of the work vehicle 12 and/or raise one or more of the ground-engaging tools of the implement 10. As such, by implementing the control action, the system 100 may prevent cultivation of portions of the field while one or more ground-engaging tools are not engaging the soil due to, for example, a sheared or broken shear pin(s) 90.

Figure 8:
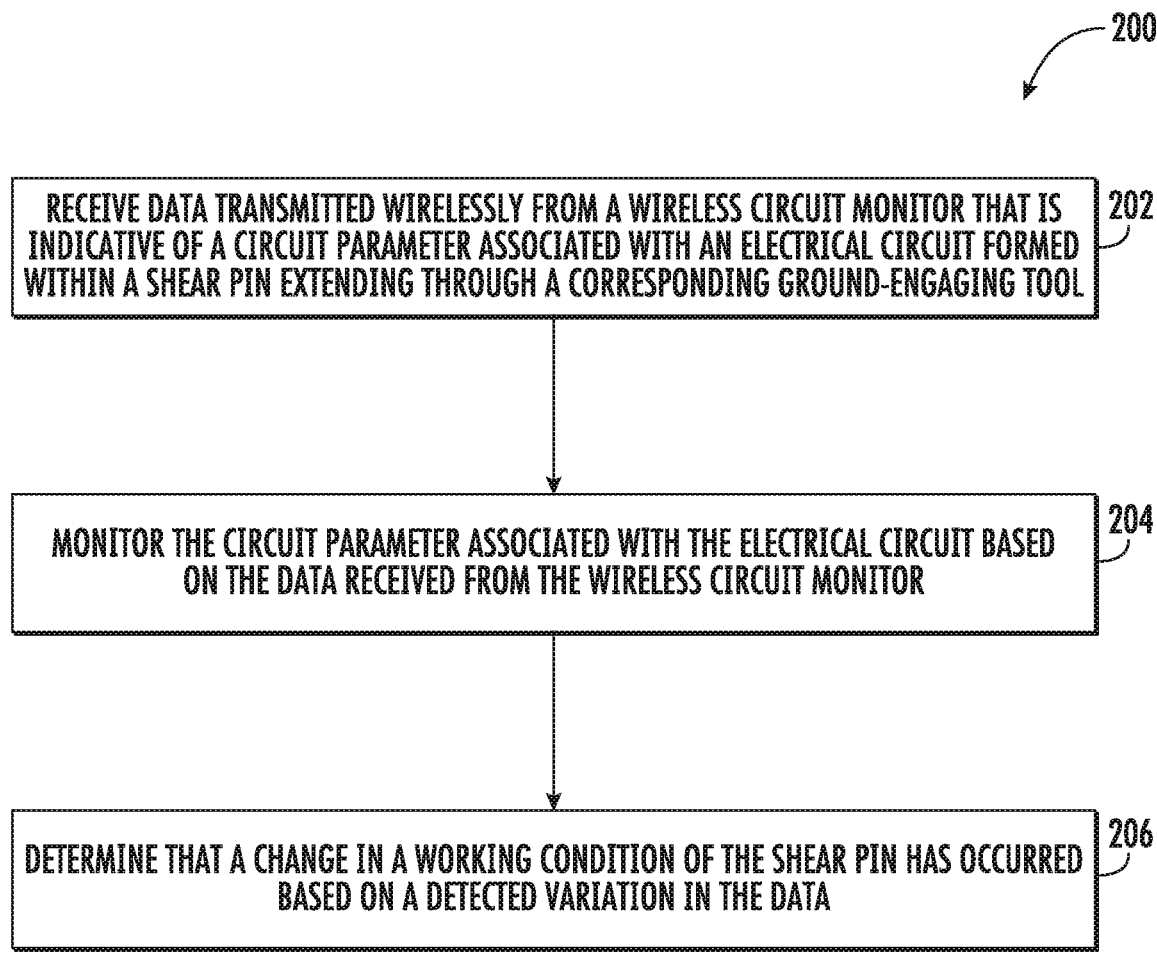
FIG. 8 illustrates a flow diagram of one embodiment of a method for monitoring the operational status of a ground-engaging tool of an agricultural implement in accordance with aspects of the present subject matter.

Referring now to FIG. 8, a flow diagram of one embodiment of a method 200 of monitoring the operational status of a ground-engaging tool of an agricultural implement is illustrated in accordance with aspects of the present subject matter. In general, the method 200 will be described herein with reference to the implement 10, shank assembly 60, and system 100 described above with reference to FIGS. 1-7. However, it should be appreciated by those of ordinary skill in the art that the disclosed method 200 may generally be utilized to determine the operational status of any suitable ground-engaging tool associated with any suitable agricultural implement and/or may be utilized in connection with a system having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include receiving data transmitted wirelessly from a wireless circuit monitor that is indicative of a circuit parameter associated with an electrical circuit formed within a shear pin extending through a corresponding ground-engaging tool. For instance, as indicated above, a wireless circuit monitor 102 may be electrically coupled to an electrical circuit 104 formed within a shear pin 90 of a respective shank assembly 60 to allow the circuit monitor 102 detect one or more circuit parameters associated with the circuit 104. Data indicative of the detected circuit parameter may then be transmitted wirelessly from the circuit monitor 102 to an associated antenna 106 for subsequent receipt by the controller 108.

Additionally, at (204) the method 200 may include monitoring the circuit parameter associated with the electrical circuit based on the data received from the wireless circuit monitor. For instance, as indicated above the controller 102 may be configured to monitor one or more circuit parameters associated with each electrical circuit 104 based on the data transmitted from the wireless circuit monitor 102, such as monitoring the opened/closed state of each electrical circuit 104 and/or by monitoring the resistance in each electrical circuit 104.

Moreover, at (206), the method 200 may include determining that a change in a working condition of the shear pin has occurred based on a detected variation in the data. For instance, as indicated above, the controller 108 may be configured to determine or infer when a shear pin 90 has failed by identifying a variation in the monitored circuit parameter associated with the electrical circuit, such as when the associated electrical circuit 104 has transitioned from a closed state to an opened state and/or by detecting a variation in the resistance of the electrical circuit 104. Alternatively, the detected variation in the data may result from a lack of any further data being transmitted from the a given wireless circuit monitor 102, in which case the controller 108 may infer or determine that the associated shear pin 90 has failed.

It is to be understood that the steps of the method 200 is performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for wirelessly monitoring the operational status of ground-engaging tools of agricultural implements, the system comprising:
   an attachment structure configured to be coupled to a frame of an agricultural implement;
   a ground-engaging tool pivotably coupled to the attachment structure at a pivot point;
   a shear pin at least partially extending through both the attachment structure and ground-engaging tool to prevent pivoting of the ground-engaging tool about the pivot point when the shear pin is in an operable working condition;
   a conductive member extending at least partially within the shear pin to form an electrical circuit therein;
   a wireless circuit monitor electrically coupled to the conductive member such that the wireless circuit monitor is configured to detect a circuit parameter associated with the electrical circuit, the wireless circuit monitor being further configured to wirelessly transmit data indicative of the detected circuit parameter;
   an antenna configured to receive the data transmitted wirelessly from the wireless circuit monitor; and
   a controller communicatively coupled to the antenna, the controller configured to monitor the data received by the antenna and identify a change in the working condition of the shear pin based on a detected variation in the data.

2. The system of claim 1, wherein the detected circuit parameter is indicative of least one of an opened/closed state of the electrical circuit or a resistance in the electrical circuit.

3. The system of claim 2, wherein the controller is configured to identify a change in the working condition of the shear pin indicative of shear pin failure when the data indicates that the electrical circuit has transitioned from a closed state to an opened state.

4. The system of claim 2, wherein the controller is configured to identify a change in the working condition of the shear pin indicative of shear pin failure when the data indicates a variation in the resistance in the electrical circuit.

5. The system of claim 1, wherein the controller is configured to identify a change in the working condition of the shear pin indicative of shear pin failure when the controller determines that the antenna is no longer receiving data from the wireless circuit monitor.

6. The system of claim 1, wherein the wireless circuit monitor comprises a sensor configured to detect, the circuit parameter associated with the electrical circuit and a wireless communications device configured to wirelessly transmit the data to the antenna.

7. The system of claim 5, wherein the wireless communications device comprises an RFID tag.

8. An agricultural implement, comprising:
a frame;
a plurality of shank assemblies supported relative to the frame, each shank assembly comprising:
an attachment structure configured to be coupled to the frame;
a shank pivotably coupled to the attachment structure at a pivot point;
a shear pin at least partially extending through both the attachment structure and shank to prevent pivoting of the shank about the pivot point when the shear pin is in an operable working condition; and
a conductive member extending at least partially within the shear pin to form an electrical circuit therein; and
a plurality of wireless circuit monitors, each wireless circuit monitor of the plurality of wireless circuit monitors being electrically coupled to the conductive member of a respective shank assembly of the plurality of shank assemblies such that the wireless circuit monitor is configured to detect a circuit parameter associated with the electrical circuit of the respective shank assembly, each wireless circuit monitor being further configured to wirelessly transmit data indicative of the detected circuit parameter;
an antenna configured to receive the data transmitted wirelessly from the plurality of wireless circuit monitors; and
a controller communicatively coupled to the antenna, the controller configured to monitor the data received by the antenna and identify a change in the working condition of the shear pin of a given shank assembly of the plurality of shank assemblies based on a detected variation in the data.

9. The agricultural implement of claim 8, wherein the detected circuit parameter is indicative of least one of an opened/closed state of the electrical circuit or a resistance in the electrical circuit of the given shank assembly.

10. The agricultural implement of claim 9, wherein the controller is configured to identify a change in the working condition of the shear pin of the given shank assembly indicative of shear pin failure when the data indicates that the electrical circuit of the given shank assembly has transitioned from a closed state to an opened state.

11. The agricultural implement of claim 9, wherein the controller is configured to identify a change in the working condition of the shear pin of the given shank assembly indicative of shear pin failure when the data indicates a variation in the resistance in the electrical circuit of the given shank assembly.

12. The agricultural implement of claim 8, wherein the controller is configured to identify a change in the working condition of the shear pin indicative of shear pin failure when the controller determines that the antenna is no longer receiving data from the wireless circuit monitor.

13. The agricultural implement of claim 8, wherein each wireless circuit monitor comprises a sensor configured to detect the circuit parameter associated with the electrical circuit of the respective shank assembly and a wireless communications device configured to wirelessly transmit the data to the antenna.

14. A method for wirelessly monitoring the operational status of a ground-engaging tool pivotally coupled to a frame of an agricultural implement, the method comprising:
receiving data transmitted wirelessly from a wireless circuit monitor that is indicative of a circuit parameter associated with an electrical circuit formed within a shear pin extending through the ground-engaging tool, the shear pin configured to prevent pivoting of the ground-engaging tool about a respective pivot point when the shear pin is in an operable working condition;
monitoring, with a computing device, the circuit parameter associated with the electrical circuit based on the data received from the wireless circuit monitor; and
determining, with the computing device, that a change in the working condition of the shear pin has occurred based on a detected variation in the data.

15. The method of claim 14, wherein monitoring the circuit parameter associated with the electrical circuit comprising monitoring at least one of an opened/closed state of the electrical circuit or a resistance in the electrical circuit based on the data received from the wireless circuit monitor.

16. The method of claim 15, wherein determining that a change in the working condition of the shear pin has occurred comprises determining that a shear pin failure has occurred when the data received from the wireless circuit monitor indicates that the electrical circuit has transitioned from a closed state to an opened state.

17. The method of claim 15, wherein determining that a change in the working condition of the shear pin has occurred comprises determining that a shear pin failure has occurred when the data received from the wireless circuit monitor indicates a variation in the resistance in the electrical circuit.

18. The method of claim 14, wherein determining that a change in the working condition of the shear pin has occurred comprises determining that data is no longer being received from the wireless circuit monitor.

19. The method of claim 14, wherein the wireless circuit monitor comprises a sensor configured to detect the circuit parameter associated with the electrical circuit and a wireless communications device configured to wirelessly transmit the data to an antenna communicatively coupled to the computing device.

20. The method of claim 11, further comprising:
at least one of notifying an operator of the agricultural implement of the change in the working condition of the shear pin or implementing a control action in response to the change in the working condition of the shear pin.

* * * * *